(12) United States Patent
Kao

(10) Patent No.: US 6,615,686 B1
(45) Date of Patent: Sep. 9, 2003

(54) BIKE STEM CLAMPING DEVICE

(76) Inventor: Yu-Ju Kao, 2, Alley 1, Lane 29, Sec. 2, Pei-Shin Rd., Shin-Tien City, Taipei Hsien (TW)

( * ) Notice: Subject to any disclaimer, the term of this patent is extended or adjusted under 35 U.S.C. 154(b) by 0 days.

(21) Appl. No.: 10/157,112

(22) Filed: May 30, 2002

(51) Int. Cl.[7] .......................... B62K 21/12; A47K 1/08; B62J 3/00
(52) U.S. Cl. ............... 74/551.8; 248/311.2; D12/114; 224/412
(58) Field of Search ............... 74/551.8; 248/311.2, 248/313, 302, 230.1; 224/412; D12/114

(56) References Cited

U.S. PATENT DOCUMENTS

| | | | | | |
|---|---|---|---|---|---|
| 3,021,106 A | * | 2/1962 | Kramer | ...................... | 248/226 |
| 4,315,583 A | * | 2/1982 | Hine | ........................... | 224/41 |
| D264,954 S | * | 6/1982 | Blackburn | ................. | D12/114 |
| 4,542,839 A | * | 9/1985 | Levine et al. | .................. | 224/36 |
| D285,186 S | * | 8/1986 | Sinyard | ...................... | D12/114 |
| 5,170,981 A | * | 12/1992 | Lin | ........................... | 248/311.2 |
| 5,406,816 A | * | 4/1995 | Thomas | ...................... | 62/457.1 |
| 5,752,687 A | * | 5/1998 | Lynch | ...................... | 248/311.2 |
| 5,839,632 A | * | 11/1998 | Koday | ......................... | 224/414 |
| 6,357,708 B1 | * | 3/2002 | Carson | ..................... | 248/229.1 |
| 6,457,691 B1 | * | 10/2002 | Kao | ........................... | 248/311.2 |

FOREIGN PATENT DOCUMENTS

DE           4215283 A1   * 11/1993       ................. 74/551.8

\* cited by examiner

Primary Examiner—Vinh T. Luong
(74) Attorney, Agent, or Firm—Bacon & Thomas, PLLC

(57) ABSTRACT

A bike stem clamp. The clamp is adapted to a stem connected to a handle of the bike. The clamp includes one or more fingers extending from its surface that are interlocked with a fixation plate adapted at an angle and adjustable with a clip accommodating a water bottle, speedometer, trip odometer, lighting fixture or any other object with a selected purpose and adapted to the bike.

5 Claims, 4 Drawing Sheets

BIKE STEM CLAMPING DEVICE

BACKGROUND OF THE INVENTION (a) Field of the Invention

The present invention is related to a bike stem clamping device, and more particularly, to one having extended from its end one or a plurality of fingers to secured at an angle adjustable to a fixation plate accommodating an auxiliary object to the bike.

(b) Description of the Prior Art

A bike stem of the prior art is essentially comprised of a front clamp locked to the stem for the stem to be secured to the handle of the bike. However, the arc surface of said clamp is smooth and serves the only and one purpose to fasten the stem to the handle.

SUMMARY OF THE INVENTION

The primary purpose of the present invention is to provide a bike stem clamp with its angle adjustable and adapted to a fixation plate accommodating water bottle, speedometer, trip odometer, lighting fixture or other selected options attached to the bike. To achieve the purpose, one finger extends from the surface of clamp to be interlocked with the fixation plate.

Another purpose of the present invention is to provide a bike stem clamp having a plurality of fingers extending from the surface of the clamp to be secured to a fixation plate by insertion of a fastener.

Another purpose yet of the present invention is to provide a bike stem clamp having a plurality of fingers extending from the surface of the clamp; within, a threaded hole is provided in a selected finger for the insertion of a fastener to be directly secured in said threaded hole for the clamp to be interlocked with the fixation plate.

DETAILED DESCRIPTION OF THE PREFERRED EMBODIMENTS

Figure 1:
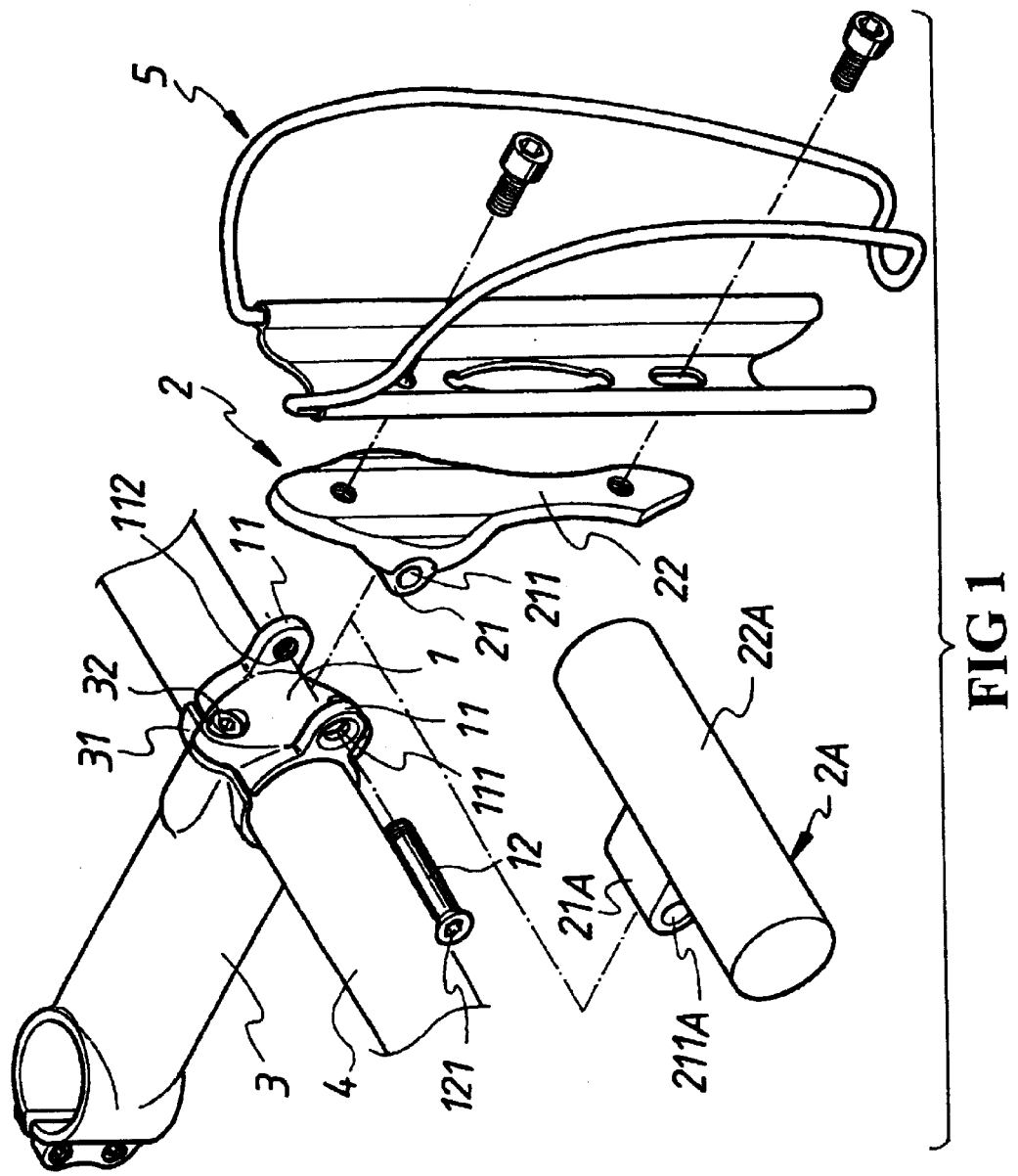
FIG. 1 is a perspective view of a preferred embodiment of the present invention.
Figure 2:
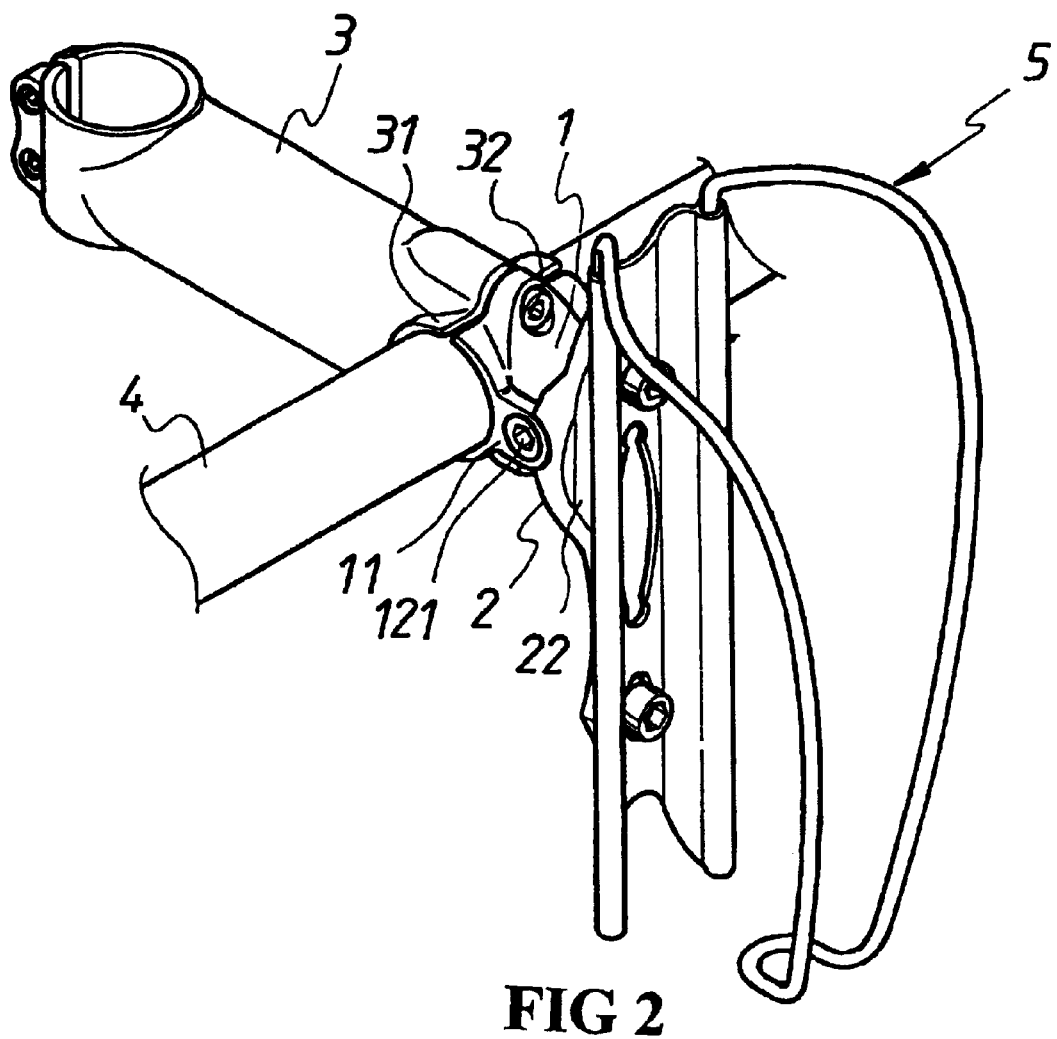
FIG. 2 is a perspective view showing that the preferred embodiment is adapted to a water bottle fixation plate.
Figure 4:
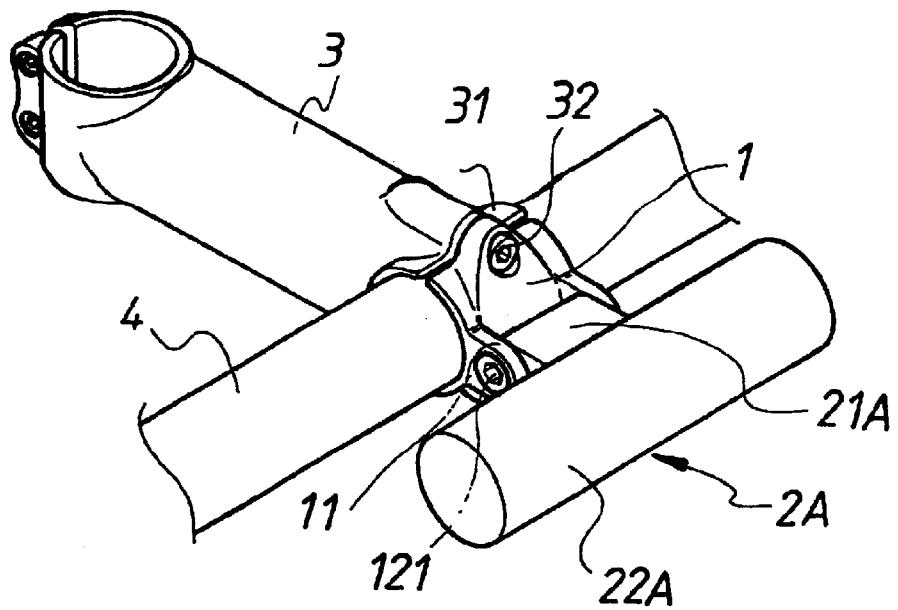
FIG. 4 is a perspective view of the preferred embodiment being adapted to another type of fixation plate.

As illustrated in FIG. 1, a bike stem clamp is essentially comprised of a clamp 1 and a fixation plate 2 (2A). Wherein, the clamp 1, related to an arc shape, provided at where in relation to another clamp 31 at the front end of a stem 3; a locking hole is each provided at the upper and the lower ends of the clamp 1 for the stem to be fastened to a handle 4 of the bike by having fastening a bolt 32 to the clamp 31 at the front end of the stem 3. One or a plurality of fingers 11 is further extending from the surface of the clamp 1 with each finger 11 provided with a matching locking hole 111 to receive insertion of a fastener 12 for the clamp 1 to be interlocked with the fixation plate 2 (2A) as illustrated in FIGS. 2 and 4.

The fixation plate 2 (2A) relates to a clip 5 to accommodate a water bottle, a speedometer, a trip odometer, a lighting fixture or any other object with a selected purpose adapted to the bike. A pivoting portion 21(21A) having an opening 211 (211A) is provided at the front end of the fixation plate 2(2A) to be interlocked with the finger 11 from the clamp 1.

The fixation plate 2 or 2A varies depending on the type of object to be attached to the bike. In the preferred embodiment, a water bottle clip 5 is incorporated to the fixation plate 2 or 2A. Wherein, the rear section of the fixation plate 2 is formed with a strip base 22 to be locked to the water bottle clip 5. Similarly, the rear section of the fixation plate 2A may be formed with a bridge rod 22A or in any other appropriate configuration to be incorporated to a clip of a selected object, e.g. a speedometer, a trip odometer, a lighting fixture or any other object with a selected purpose.

Figure 3:
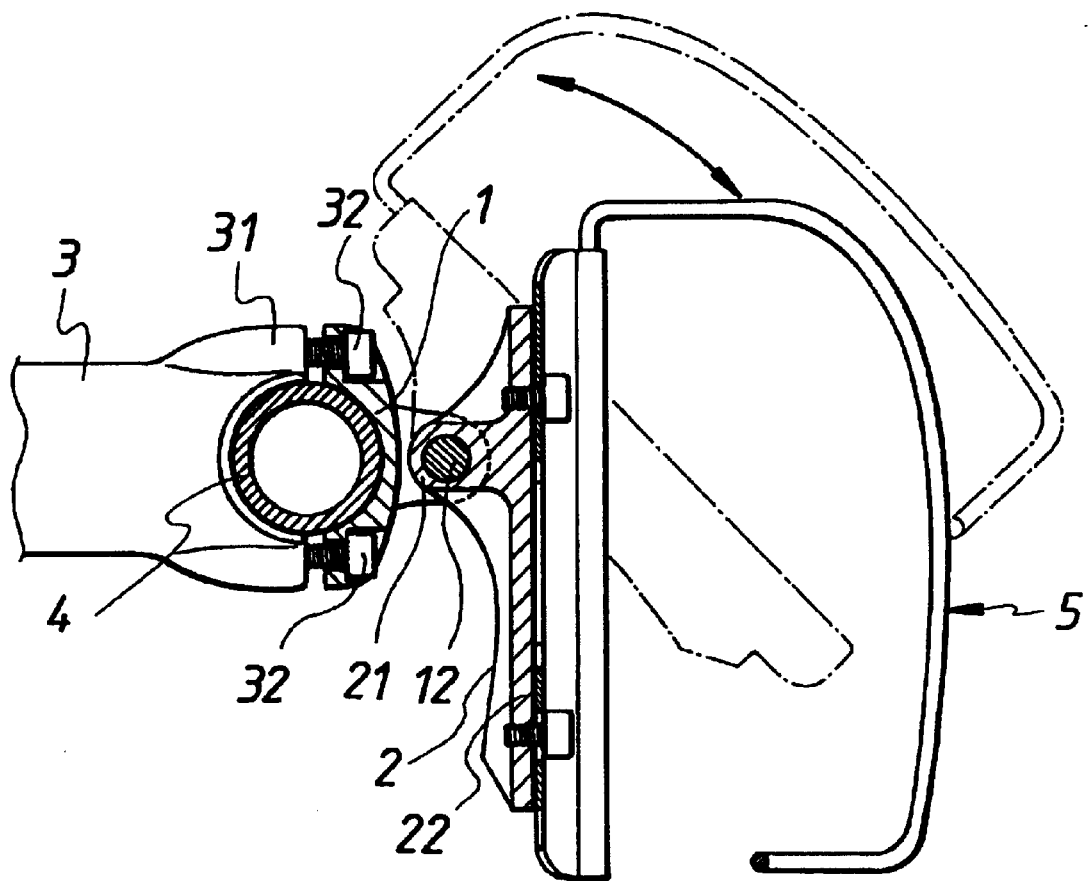
FIG. 3 is a schematic view showing that the angle of the preferred embodiment adapted to the fixation plate is adjustable.
Figure 5:
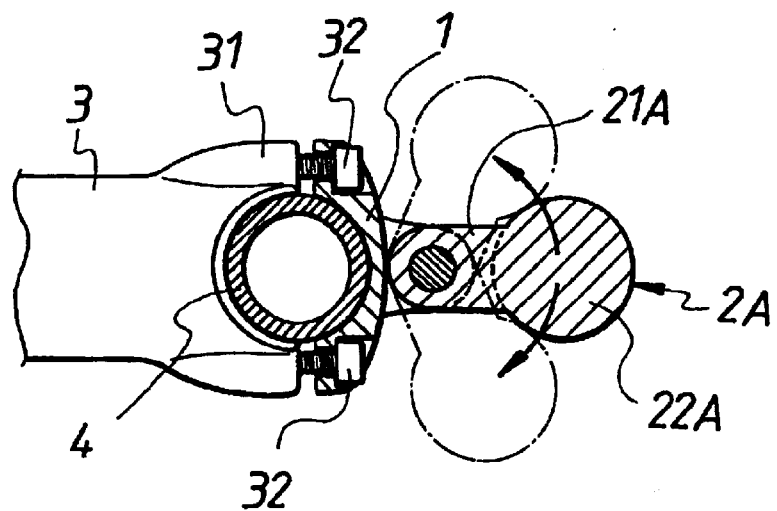
FIG. 5 is a schematic view showing that the angle of the preferred embodiment adapted to another type of fixation plate is adjustable.

A pivoting part 21 (21A) at the front of the fixation plate 2 (2A) is formed to be mutually adapted to the finger 11 extending from the surface of the clamp 1. Meanwhile a fastener 12 is inserted through both of the clamp 1 and the pivoting part 21 (21A) for the fixation plate 2 (2A) to be secured in position. To facilitate adaptation to the selected object attached to the bike, simply adjust the angle of the fixation plate 2 (2A) by loosening the fastener 12 as illustrated in FIGS. 3 and 5. Accordingly, the object secured to the clip 5 can also be adjusted for its optimal angle.

When a plurality of fingers 11 is provided, a threaded hole 112 may be provided in one finger 11 on one end of the claim 1 for the fastener 12 to be directly locked in the threaded hole 112 so that only one fastener 12 will be sufficient. Furthermore, the finger 11 on the other end may be provided with the matching locking hole 111 being chamfered to form a graded hole having a larger diameter than that of the threaded hole 112 so that the head 121 of the fastener 12 can be flushed after insertion through the graded hole and the threaded hole 112 (as shown in FIG. 1).

Furthermore, as the finger 11 extending from the clamp 1 is interlocked with the pivoting part 21 (21A) provided at the front end of the fixation plate 2 (2A), one or a plurality of fingers 11 may be provided as long as the pivoting part 21 (21A) of the fixation plate 2 (2A) can be mutually adapted to or incorporated with the finger or fingers 11. Therefore, it is to be noted that any equivalent change identical or similar means within the teaching of the present invention falls within the scope of the characteristics of the present invention while that disclosed in the accompanying drawings relates to an example of a preferred embodiment of the present invention and is not given to restrict the scope of patent of the application.

What is claimed is:

1. A bike stem clamp comprising:
    a first clamp and a fixation plate, wherein, the clamp having an arc shape is locked to another clamp extending from a front end of a bike stem;
    a pair of spaced apart fingers extending from a surface of the bike stem clamp with each finger provided with a hole configured to receive insertion of a fastener therein for the bike stem clamp to be interlocked with ;the fixation plate;
    the fixation plate having at its front end formed a pivoting part mutually adapted to the finger extending from a surface of the bike stem clamp such that the fastener being inserted through both of the bike stem clamp and the pivoting part for the fixation plate is secured in position;
    the angle of the fixation plate being adjustable by loosening the fastener; and the hole provided in one of the fingers is a threaded hole, and the hole provided in the other one of the fingers is a matching locking hole that is chamfered to form a graded hole having a larger diameter than that of the threaded hole so that a head of the fastener can be flush with the bike stem clamp after insertion to the matching locking hole and the threaded hole.

2. The bike stem clamp as claimed in claim 1, wherein, the finger extending from the stem clamp is interlocked with the pivoting part provided at the front end of the fixation plate.

3. The bike stem clamp as claimed in claim 1, wherein, the fixation plate secures a clip adapted to receive an object with a selected purpose and adapted to a bike.

4. The bike stem clamp as claimed in claim 1, wherein, a rear section of the fixation plate includes a strip base.

5. The bike stem clamp as claimed in claim 1, wherein, a rear section of the fixation plate includes a bridge rod.

* * * * *